United States Patent [19]
Thongs, Jr.

[11] Patent Number: 5,227,208
[45] Date of Patent: Jul. 13, 1993

[54] INTEGRALLY WOUND JOINT STRUCTURE

[75] Inventor: Lawrence C. Thongs, Jr., Huntsville, Ala.

[73] Assignee: The United States of America as represented by the Secretary of the Army, Washington, D.C.

[21] Appl. No.: 896,776

[22] Filed: Jun. 10, 1992

Related U.S. Application Data

[62] Division of Ser. No. 741,002, Aug. 6, 1991, Pat. No. 5,160,392.

[51] Int. Cl.$^5$ ............................................. B65D 90/00
[52] U.S. Cl. ................................ 428/34.7; 220/588; 220/589; 220/590; 220/414; 60/253; 60/255; 428/36.3
[58] Field of Search ............... 156/172, 170, 173, 175, 156/169; 220/588, 589, 590, 414; 60/253, 200.1, 255; 102/287, 291, 347; 428/36.1, 36.2, 36.3, 36.92, 34.7, 34.5, 34.6

[56] References Cited

U.S. PATENT DOCUMENTS

| | | | |
|---|---|---|---|
| 2,995,011 | 8/1961 | Kimmel | 220/590 X |
| 3,282,757 | 11/1966 | Brussee | 156/285 X |
| 3,750,823 | 8/1973 | Carter et al. | 220/590 X |
| 3,843,010 | 10/1974 | Morse et al. | 220/590 |
| 3,915,776 | 10/1975 | Kaempen | 156/173 X |
| 4,515,912 | 5/1985 | Sayles | 149/2 X |
| 4,585,136 | 4/1986 | Clark | 220/590 |
| 4,685,589 | 8/1987 | Benton | 220/590 X |
| 4,732,634 | 3/1988 | Hill et al. | 156/173 X |
| 4,852,347 | 8/1989 | Reynolds et al. | 60/253 |
| 4,854,988 | 8/1989 | Voirol et al. | 156/173 X |
| 4,969,812 | 7/1976 | Beck | 220/590 X |
| 5,025,943 | 6/1991 | Forsman | 220/590 X |

Primary Examiner—Jeff H. Aftergut
Attorney, Agent, or Firm—Hugh P. Nicholson; Freddie M. Bush

[57] ABSTRACT

A method is disclosed for forming an integrally wound joint structure with a filament wound composite structure at an adjacent end of the integrally wound joint structure and having means for attaching said integrally wound joint structure to another structure provided at other end of said joint structure. The joint structure includes filament winding over a joint tube or joint solid with appropriately sized and spaced grooves running circumferentially around the outer surface of the joint structure. A curable resin is employed in filament winding to complete an assembly which is placed in a conventional oven and allowed to cure.

7 Claims, 1 Drawing Sheet

INTEGRALLY WOUND JOINT STRUCTURE

CROSS REFERENCE TO RELATED APPLICATION

This is a division of application Ser. No. 07/741,002, filed Aug. 6, 1991, now U.S. Pat. No. 5,160,392.

The invention described herein may be manufactured, used, and licensed by or for the Government for governmental purposes without the payment to me of any royalties thereon.

BACKGROUND OF THE INVENTION

The problem of joining composite cylinders or other tubular bodies to other structures is a recurring one in the design and manufacture of missile bodies, pressure vessels, and other load bearing structures.

In the past the conventional approach to the problem has been the use of pin joints and Ortman keys.

Pin joints, which enjoy the most widespread use, are typically heavy and complicated, requiring precision or match drilling and tedious hand work to remove burrs and sharp edges. In automated assembly lines these operations require extra machine steps.

Ortman keys require tight tolerances and are problematic in assembly. They cannot easily connect noncylindrical tubular bodies. In addition to this, Ortman keys are very difficult if not impossible to disassemble.

Ortman keys are well known and characteristically join tubular members or cylindrical bodies by means of a rectangular or similarly shaped member which fills a groove which the two members to be joined have in common.

Desirable would be a method for the joining of tubular composite structures without the complications or tight tolerances of pin joints and Ortman keys.

The primary object of this invention is to provide a method of joining a tubular composite structure to another structure.

Another object of this invention is to provide for the joining of a tubular composite structure to another structure in such a way as to form an assembly with adequate structural strength in tension, internal pressurization, bending, compression, and shear as to be useful in a wide variety of applications.

Still a further object of this invention is to provide for the joining together of tubular composite structures and other structures in such a way as to allow for easy assembly and disassembly, or alternately, for permanent assembly.

SUMMARY OF THE INVENTION

The method of joining a tubular composite or a composite cylindrical member to another structure to form an assembly with adequate structural strength in tension, internal pressurization, bending, compression, and shear is particularly useful in the design and manufacture of missile bodies, pressure vessels, and other load bearing structures. The method employs a filament winding technique which employs a curable resin. The filament material can be high strength graphite, glass, or poly-p-ethylene terephthalamide fibers (Kevlar) or other filament material. The curable resin is selected from commercially available diglycidyl ether of bisphenol A (EPON 828) and an expoxidized dimer acid (EPON 871) equal parts each or other resins used in filament wound composite structures.

The method of this invention comprises providing a tube or solid structure of sufficient tensile and shear strength with an appropriate number of circumferential grooves cut into the outer surface, and threaded or otherwise adapted for attachment at the end with an interfacing structure. The joint tube or solid so prepared is next placed on or abutted against a conventional mandrel and held in place by friction or in some other way so as to permit its being integrated into a filament wound structure.

The cut circumferential grooves are wound with a filament overlay consisting of helix and hoop windings which employ low and high tension, respectively. A transitional region is provided for each circumferential ring by winding hoop in such a way as to build a wedge shaped band which smoothly spans the distance from the bottom of the groove to the top of the circumferential ring. (The wedges may be made as an integral part of the joint structure, thus obviating the procedure of winding hoop wedges. The secondary bond between the joint material and the composite, however, will make it easier for the cured composite overwrap to slide up the wedge. A composite overwrap, cured with composite hoop bands, using a single resin system, will provide much better adhesion between overwrap and wedges.) Onto the joint structure and wedge assembly is wound a filament overlay consisting of helical and hoop layers which employ low and high tension, respectively. The low tension of the helix layers allows the high tension hoop layers to pull the helical layers down into the grooves. Hoop should be used to pull down each helical layer individually. The hoop layers may be restricted to the joint area or may extend to the rest of the composite structure as required for hoop strength. Alternatively, glass cloth woven from alumina bore glass fiber or similar material can be added between helix layers in the joint area to help transfer shear loads from layer to layer. When the filament winding phase of fabrication is completed the assembly is placed in a conventional oven and allowed to cure. After conventional composite curing, the assembly is separated from the mandrel. Joining of the filament wound structure and the integrally wound joint cylinder (or other shaped joint structure) to another structure may be achieved by threaded connection or other conventional joining mechanism.

DESCRIPTION OF THE PREFERRED EMBODIMENT(S)

Figure 1:
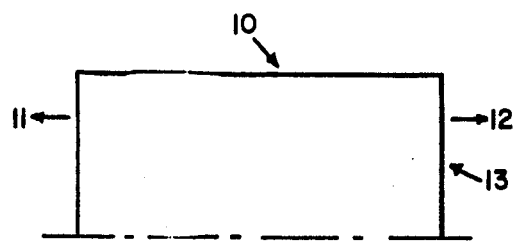
FIG. 1 is a general example 10 of a solid or tube with any cross sectional shape showing relative location direction 11 to composite structure, location direction 12 to structure to be attached, and joint mechanism area 13.

The integrally wound joint structure as further disclosed hereinbelow provides a solution to the recurring problem of joining composite structures to other structures in the manufacture of missile bodies, pressure vessels, and other load bearing structures.

The following description of the invention relates to a convenient and effective means for joining a tubular, filament wound composite structure, with circular, square, or any other cross section to another body of any shape. The joining is achieved by filament winding over a joint tube or joint solid with appropriately sized and spaced groove(s) running circumferentially on the outer surface. The joint tube or solid must be equipped at the end to be joined with threads or some other means of attachment. The joint tube or solid will supply an effective union with the filament wound composite on one end while the other end will provide, by threads or some other conventional means, for joining the composite tube to another structure.

The helical windings of the tubular composite structure must be applied at low tension, so that higher tension hoop may be used to pull the helix layers down into the grooves.

After conventional composite curing and separating of the assembly from the mandrel the composite tube may be joined to another body by means of the threads or other conventional joint mechanism.

In further reference to the several Figures of the Drawing and the following detailed description, a full appreciation and understanding of the invention will be revealed.

FIG. 1 depicts a general example 10 of a solid or tube with any cross sectional shape which can be of any geometric shape such as hexagonal, square, rectangular, elliptical, cylindrical, and variations of the same.

Figure 2:
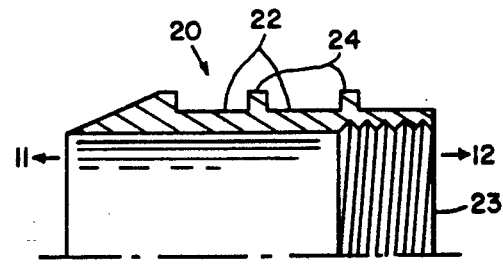
FIG. 2 depicts a cylindrical example of an in process structure depicting joint cylinder 20 with circumferential grooves 22, internal threads 23 for structure to be attached, and directional numerals 11 and 12 as shown in FIG. 1.

FIG. 2, for example, depicts a cylindrical example wherein a joint cylinder 20 depicts circumferential grooves 22, internal threads 23, and directional numerals 11 and 12 which show relative direction to the remainder of the composite structure and to the structure to which the joint cylinder is to be attached.

The method for forming an integrally wound joint structure comprises completing the following procedures:

1) A tube 20 of sufficient tensile and shear strength with an appropriate number of circumferential grooves 22 on the outer surface and threaded 23 (or otherwise adapted for attachment) on the end to be interfaced in joining (as illustrated in FIG. 2) is prepared in a conventional manner to receive filament winding. The joint tube or solid is placed on or abutted against a conventional mandrel and held in place by friction or in some other manner in such a way as to be integrated into the filament wound structure.

2) After the joint tube or cylinder and the mandrel have received final preparation an optional layer of E glass cloth (or some similar flat orthotropic cloth which is not too stiff to conform to the outer contour of the joint tube or solid) may be wetted with resin and wrapped around the joint cylinder. The E glass fiber in the cloth is an alumina bore glass fiber well known in the industry.

3) The next step is to wind hoop bands in the conventional manner in such a way as to build wedge shaped bands 31 to provide a transition from the circumferential rings 24 to the bottoms of the grooves 22 (see FIG. 2).

Figure 3:
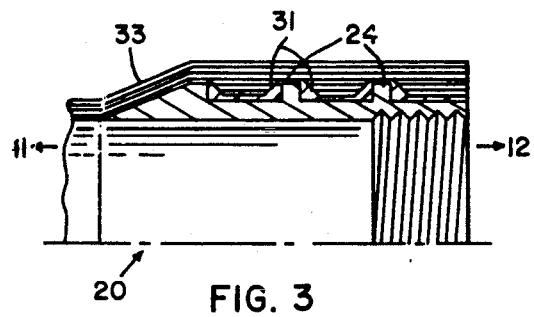
FIG. 3 depicts the joint cylinder 20 of FIG. 2 and additionally depicting wedge shaped bands 31 in the grooves, composite overwrap 33, and directional numerals 11 and 12.

4) Helix and hoop windings are wound onto the mandrel and joint cylinder in the conventional manner with the exception that the helix layers are applied with low tension. This low tension allows for hoop layers to be wound over the helix layers in the groove areas, pulling down the helix into the grooves. (It may be necessary to cut the fibers beyond the joint area in order to provide enough slack in the helix layers to allow them to be pulled down fully.) High tension hoop should be used in the groove areas for this purpose. Hoop should be used to pull down each helix layer individually in the groove areas. The hoop layers may be restricted to the joint area or may extend to the rest of the composite structure as needed for hoop strength (Refer to FIG. 3 which depicts wedge shaped bands 31, helix and hoop windings over circumferential rings 24, and composite overwrap 33). In addition to this, glass cloth or some similar material added between helix layers in the joint area may help to transfer shear loads from layer to layer.

5) When the filament winding phase of fabrication is completed the assembly may be placed in a conventional oven and allowed to cure. The composite and joint cylinder assembly may then be removed from the mandrel in the normal fashion.

6) To join the filament wound structure and integrally wound joint cylinder to another properly threaded body simply screw them together (or utilize whatever form of joining mechanism has been selected).

Figure 4:
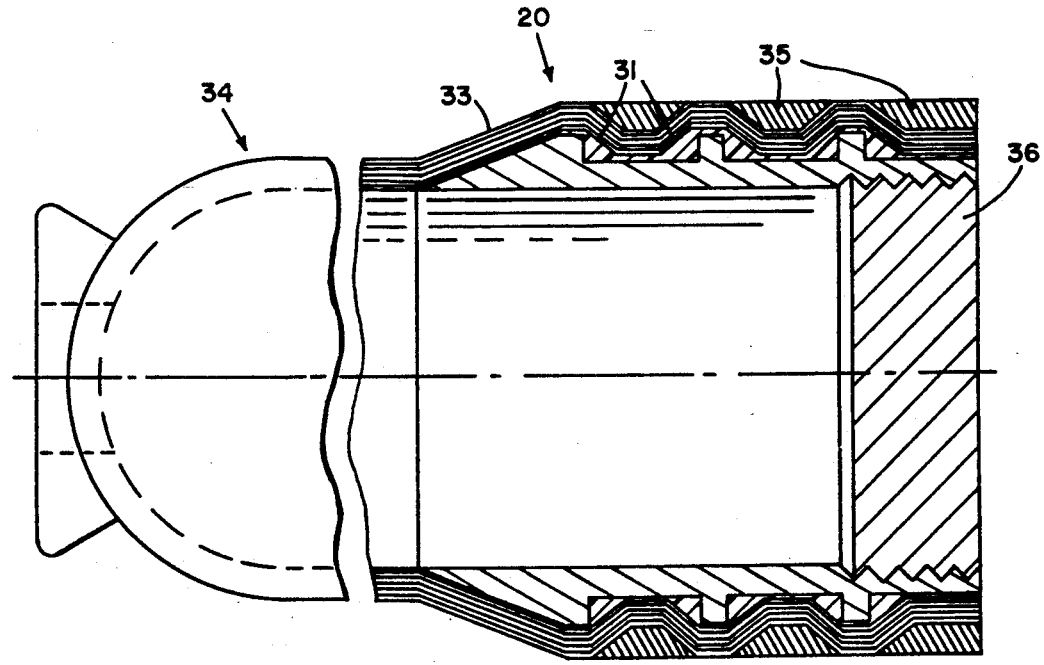
FIG. 4 depicts a completed joint cylinder 20 with portion of an overwrapped composite structure 34 and with plug 36 as attached structure in place for an analog motorcase wherein composite overwrap 33 is shown pulled down into the circumferential grooves and over wedge shaped bands 31 by additionally applied hoop bands 35.

FIG. 4 depicts a completed joint cylinder 20 with portion of an overwrapped composite structure 34 with plug 36 as attached structure in place for an analog motorcase wherein composite overwrap 33 is shown pulled down into the circumferential grooves and over wedge shaped bands 31 by additionally applied hoop bands 35.

Figure 5:
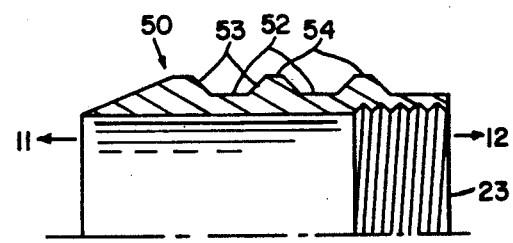
FIG. 5 depicts a joint cylinder 50 having circumferential grooves 52 cut or formed on the outer surface of the joint cylinder or solid structure to form wedge shaped regions 53 and rings 54 as an integral part of the grooves.

FIG. 5 depicts a joint assembly 50 having circumferential grooves 52 cut or formed on the outer surface of the tube or solid structure to form wedge shaped regions 53 and rings 54 as an integral part of the groove thereby obviating the need for the winding of a series of filament hoops to build the wedge shaped bands.

The fabrication and testing of the invention structure in an analog motorcase for insensitive munitions program proved highly successful. The tube was cylindrical in the joint area and the structure to be joined was a test plug. The sketch of the assembly is shown in FIG. 4. The design pressure was 4000 psi and the burst pressure of the assembly was 4420 psi in each of two tests. With the 5 inch diameter of the tube, this translates to an axial load of 86,800 pounds. It was noted that the failure occurred in the composite structure well outside the joint cylinder area in both tests thereby showing that the actual strength of the joint cylinder is above the design strength of the system to which it is joined.

I claim:

1. An integrally wound joint structure formed in accordance with the method comprising:
   (i) providing a tube or solid structure of sufficient tensile and shear strength for forming an integrally wound joint structure for joining to another structure;

(ii) cutting or forming one or more circumferential grooves and circumferential rings on an outer surface of said tube or solid structure;

(iii) providing said one or more circumferential grooves with curable resin impregnated filament wound wedge shaped regions at a bottom of said circumferential grooves by hoop winding thereby providing a transition region which enables filament winding layers to smoothly span a distance from the bottom of said circumferential grooves to the top of said circumferential rings;

(iv) providing means for attachment to another structure at one end of said tube or solid structure;

(v) preparing said tube or solid structure having said one or more of circumferential grooves provided with said curable resin impregnated filament wound wedge shaped regions and said means for attachment to receive filament winding by placing on or abutting to a mandrel of a filament winding structure;

(vi) winding curable resin impregnated filaments on said tube or solid structure by first winding helix winding layers under low tension followed by hoop winding layers under high tension to cause said helix winding layers to be pulled down individually into said circumferential grooves;

(vii) completing said filament winding by continuing alternate helix and hoop winding layers to form an integrally wound joint structure assembly having hoop strength which exceed burst pressure of the structure to which said joint structure is joined after curing;

(viii) placing said integrally wound joint structure assembly in an oven to complete curing as determined by an established curing time and temperature for said curable resin; and, (ix) removing said integrally wound joint structure assembly from said oven after complete curing, said integrally wound joint structure after complete curing being ready for attachment to another structure employing said means provided at one end of said tube or solid structure.

2. The integrally wound joint structure as defined in claim 1 wherein an optional layer of glass cloth wetted with resin is wrapped around said tube or solid structure to conform to the outer contour of said tube or solid structure prior to said winding curable resin impregnated filaments on said tube or solid structure.

3. The integrally wound joint structure as defined in claim 1 wherein said helix and hoop winding layers extend past said integrally wound joint structure to the rest of said composite structure positioned at an adjacent end of said joint.

4. The integrally wound joint structure assembly as defined in claim 3 wherein said curable resin is equal parts of diglycidyl ether of bisphenol A and an epoxidized dimer acid and wherein said filament wound on said prepared tube or solid structure is selected from graphite, glass, and poly-p-ethylene terephthalamide.

5. The integrally wound joint structure as defined in claim 4 wherein said means for attachment to another structure provided at one end of said tube and solid structure is attached to an analog motorcase and wherein said integrally wound joint assembly includes said composite structure positioned at adjacent end of said joint which is a plug.

6. The integrally wound joint structure as defined in claim 4 wherein prior to step of said winding filament winding on said prepared tube or solid structure a layer of orthotropic cloth or glass cloth woven from alumina bore glass fibers is wetted with said curable resin and wrapped around said prepared tube or solid structure having said plurality of circumferential grooves and having said means for attachment to another structure provided at one end of said tube and solid structure.

7. The integrally wound joint structure as defined in claim 6 wherein said means for attachment to another structure provided at one end of said tube and solid structure is attached to an analog motorcase and wherein said integrally wound joint assembly includes said composite structure positioned at adjacent end of said joint which is a plug.

* * * * *